United States Patent
Chang et al.

(10) Patent No.: US 9,215,014 B2
(45) Date of Patent: Dec. 15, 2015

(54) WIRELESS TRANSMISSION SYSTEM, AND METHOD FOR DETERMINING DEFAULT GAIN OF WIRELESS TRANSMISSION SYSTEM

(71) Applicant: Realtek Semiconductor Corp., HsinChu (TW)

(72) Inventors: Yuan-Shuo Chang, Taoyuan County (TW); Chien-Yu Chen, Hsinchu (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 83 days.

(21) Appl. No.: 14/253,854

(22) Filed: Apr. 15, 2014

(65) Prior Publication Data

US 2014/0307765 A1    Oct. 16, 2014

(30) Foreign Application Priority Data

Apr. 16, 2013  (TW) .............................. 102113529 A

(51) Int. Cl.

| | | |
|---|---|---|
| *H03C 1/62* | (2006.01) | |
| *H04B 17/00* | (2015.01) | |
| *H04B 17/13* | (2015.01) | |
| *H04B 17/14* | (2015.01) | |
| *H04B 17/19* | (2015.01) | |

(52) U.S. Cl.
CPC ................ *H04B 17/13* (2015.01); *H04B 17/14* (2015.01); *H04B 17/19* (2015.01)

(58) Field of Classification Search
USPC .......... 455/67.11, 67.14, 115.1, 115.2, 115.3; 324/76.11, 130
See application file for complete search history.

(56) References Cited

U.S. PATENT DOCUMENTS

| | | | |
|---|---|---|---|
| 5,423,082 A | 6/1995 | Cygan | |
| 5,542,096 A | 7/1996 | Cygan | |
| 7,738,904 B1* | 6/2010 | Chien | .................... H04W 52/52 455/522 |
| 8,340,602 B1 | 12/2012 | Peiris | |
| 8,417,194 B2 | 4/2013 | Huang | |
| 2006/0199552 A1* | 9/2006 | Blech | ...................... H04B 17/13 455/127.1 |

FOREIGN PATENT DOCUMENTS

| | | |
|---|---|---|
| CN | 1125497 A | 6/1996 |
| CN | 102882478 A | 1/2013 |

* cited by examiner

*Primary Examiner* — Nguyen Vo

(74) *Attorney, Agent, or Firm* — Winston Hsu; Scott Margo

(57) ABSTRACT

A method for determining a default gain of a wireless transmission system is provided. The wireless transmission system includes a signal transmission path and a signal feedback path coupled to the signal transmission path. The signal transmission path includes a power amplification circuit and a gain stage having a plurality of transmission gains. The method includes the following step: setting a gain of the gain stage as a specific transmission gain of the transmission gains; transmitting a plurality of test signals through the signal transmission path in sequence to generate a plurality of amplified test signals, wherein at least a portion of powers of the test signals correspond to the transmission gains, respectively; receiving the amplified test signals through the signal feedback path in sequence, and accordingly obtaining corresponding signal gains; and determining a default gain of the gain stage according to the signal gains.

18 Claims, 8 Drawing Sheets

| Control bit setting | Gain (dB) |
|---|---|
| 1111 | +6 |
| 1110 | +5 |
| 1101 | +4 |
| 1100 | +3 |
| 1011 | +2 |
| 1010 | +1 |
| 1001 | 0 |
| 1000 | -1 |
| 0111 | -2 |
| 0110 | -3 |
| 0101 | -4 |
| 0100 | -5 |
| 0011 | -6 |
| 0010 | -7 |
| 0001 | -8 |
| 0000 | -9 |

FIG. 4

WIRELESS TRANSMISSION SYSTEM, AND METHOD FOR DETERMINING DEFAULT GAIN OF WIRELESS TRANSMISSION SYSTEM

BACKGROUND OF THE INVENTION

1. Field of the Invention

The disclosed embodiments of the present invention relate to wireless communication.

2. Description of the Prior Art

In a wireless system, a performance of a transmitter strongly depends upon radio frequency (RF) gain blocks, high power amplifiers (HPAs), matching networks and other external components in a signal chain. Transmitters having identical wireless designs are expected to operate consistently in certain test cases. Unfortunately, almost no component provides very good absolute gain accuracy specifications and RF characteristics vary from device to device. In addition, a signal chain gain varies as the temperature and the frequency change.

The performance of the transmitter may be evaluated in terms of RF output power versus error-vector magnitude (EVM). Please refer to FIG. 1, which is a diagram illustrating respective relationships between respective output powers and EVMs of transmitters A, B and C. As shown in FIG. 1, the transmitter C may reach the lowest EVM (compared with the transmitters A and B) while the RF output powers are at the same level, and therefore, the performance of the transmitter C reaches the best. In other words, maximum output powers of the transmitters A, B and C are different to meet the transmitter specification (i.e. a transmitted signal is required to have an EVM less than a reference value).

Thus, there is a need for an innovative method to test and calibrate a transmitter in order to ensure a proper operating region of the transmitter to thereby provide a transmitted signal having a sufficiently high output power as well as good signal quality.

SUMMARY OF THE INVENTION

It is therefore one objective of the present invention to provide a method for determining a default gain of a wireless transmission system by using a self-calibration mechanism, and a related wireless transmission system to solve the above-mentioned problems.

According to an embodiment of the present invention, an exemplary method for determining a default gain of a wireless transmission system is disclosed. The wireless transmission system comprises a signal transmission path and a signal feedback path. The signal feedback path is coupled to the signal transmission path. The signal transmission path comprises a power amplification circuit and again stage, and the gain stage has a plurality of transmission gains. The exemplary method comprises the following steps: setting a gain of the gain stage as a specific transmission gain of the transmission gains; when the gain of the gain stage is set as the specific transmission gain, transmitting a plurality of test signals through the signal transmission path in sequence to generate a plurality of amplified test signals, wherein at least a portion of powers of the test signals correspond to the transmission gains, respectively; receiving the amplified test signals through the signal feedback path in sequence, and accordingly obtaining corresponding signal gains; and determining a default gain of the gain stage according to the signal gains.

According to an embodiment of the present invention, an exemplary wireless transmission system is disclosed. The exemplary wireless transmission system comprises a signal transmission path, a signal feedback path, a control unit, a signal generation unit and a signal processing unit. The signal transmission path comprises a gain stage and a power amplification circuit. The gain stage has a plurality of transmission gains. The signal feedback path is coupled to the signal transmission path. The control unit is arranged for setting a gain of the gain stage as a specific transmission gain of the transmission gains. The signal generation unit is coupled to the signal transmission path, and is arranged for generating a plurality of test signals, and transmitting the test signals through the signal transmission path in sequence to generate a plurality of amplified test signals when the gain of the gain stage is set as the specific transmission gain, wherein at least a portion of powers of the test signals correspond to the transmission gains, respectively. The signal processing unit is coupled to the signal feedback path, and is arranged for receiving the amplified test signals through the signal feedback path, accordingly obtaining corresponding signal gains, and determining a default gain of the gain stage according to the signal gains.

The proposed method for determining a default gain may enable a wireless transmission system to perform self-calibration so that a proper preset operating region of the wireless transmission system can be ensured. Hence, the wireless transmission system may not only meet the EVM specification but also output enough output power, resulting in improved transmitter spectral performance as well as significant savings in operating cost for an HPA. In addition, the proposed self-calibration mechanism needs not external circuits for testing a wireless transmitter, thus saving time and reducing labor costs.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a diagram illustrating an implementation of the correspondence between control bit settings of the control unit shown in FIG. 3 and the transmission gains provided by the gain stage shown in FIG. 3.

DETAILED DESCRIPTION

Figure 1:
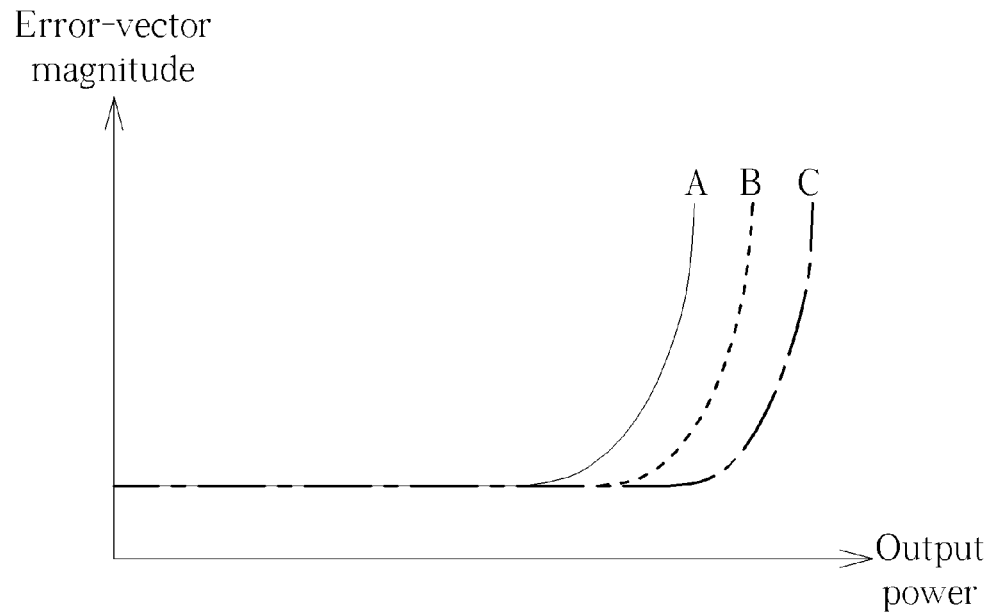
FIG. 1 is a diagram illustrating respective relationships between respective output powers and error-vector magnitudes of transmitters.
Figure 2:
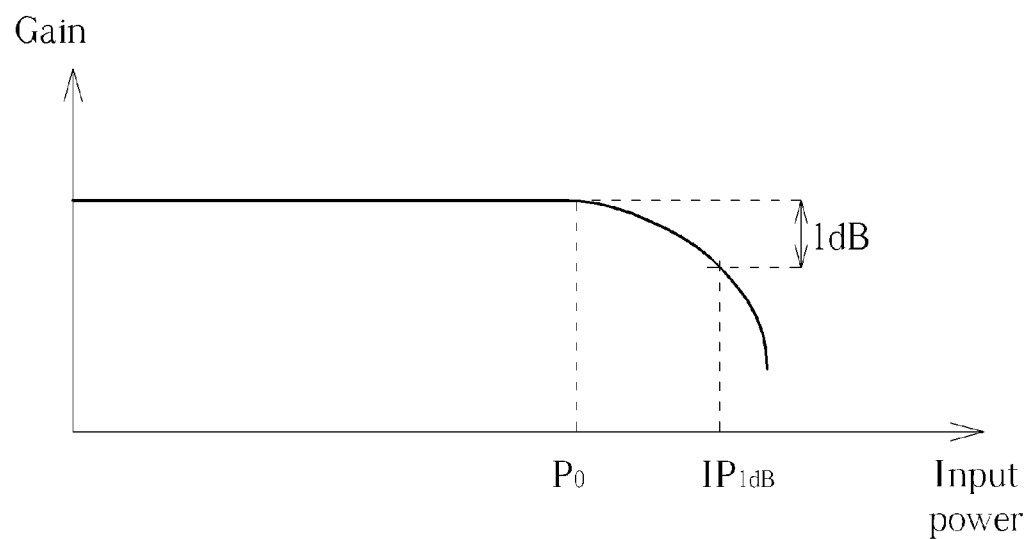
FIG. 2 is a diagram illustrating a relationship between an input power and a gain of a power amplifier.

In a wireless transmission system operating at a high transmit power, the corresponding EVM is highly correlated to a non-linear characteristic curve of a power amplifier. Please refer to FIG. 2, which is a diagram illustrating a relationship between an input power and a gain of a power amplifier. As shown in FIG. 2, the gain of the power amplifier holds substantially constant when the input power is within a linear region (i.e. the input power is less than power $IP_0$). However, when the input power enters a non-linear region (i.e. the input power is higher than the power $IP_0$), the corresponding gain starts decaying. In other words, the resultant output power is less than expected. Additionally, an EVM corresponding to the output power may increase greatly.

An input power $P_{1dB}$ is checked to evaluate the power amplifier, wherein the input power $P_{1dB}$ indicates an input power level that causes the gain of the power amplifier to drop by 1 dB (decibel) from the gain in the linear region. When the output power of the power amplifier exceeds the output power corresponding to the input power $P_{1dB}$, the performance of the transmitter becomes lower (e.g. the output power is less than expected). The present invention is to provide a self-calibration mechanism, which controls a front-stage gain of the power amplifier. Further description is detailed below.

Figure 3:
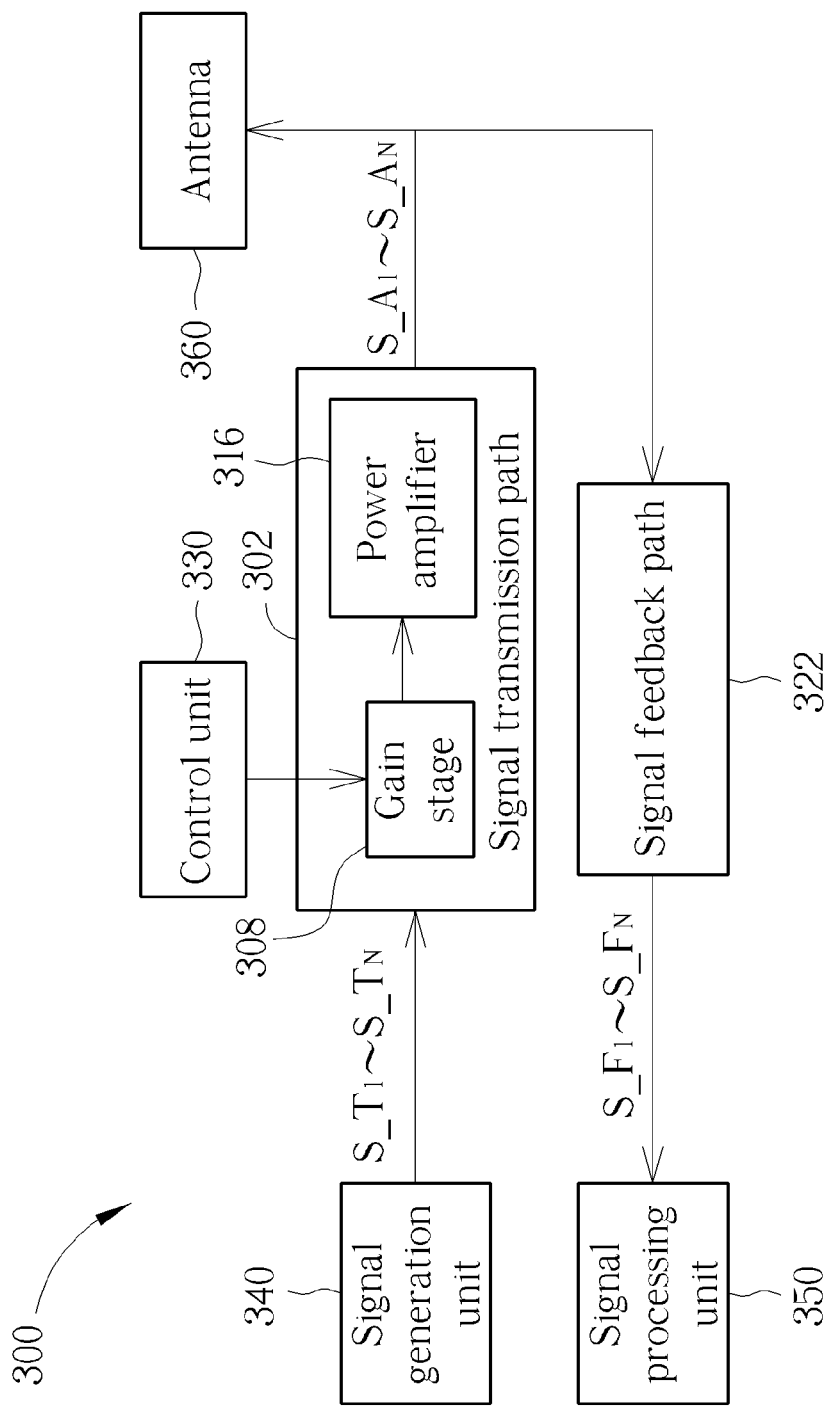
FIG. 3 is a block diagram illustrating a generalized exemplary wireless transmission system according to an embodiment of the present invention.

Please refer to FIG. 3, which is a block diagram illustrating a generalized exemplary wireless transmission system according to an embodiment of the present invention. The wireless transmission system 300 may include a signal transmission path 302, a control unit 330, a signal generation unit 340 and an antenna 360, wherein the transmission path 302 may include a gain stage 308 and a power amplification circuit 316. During signal transmission, transmitted signals are amplified by the signal transmission path 302 and radiated into the air via the antenna 360. An output power of the wireless transmission system 300 is determined mainly by respective gains provided by the gain stage 308 and the power amplification circuit 316. The gain stage 308 may have a plurality of transmission gains, and the control unit 330 may set a gain of the gain stage 308 according to the actual requirements/considerations.

In one implementation, the control unit 330 may use control bits to set the gain of the gain stage 308. Please refer to FIG. 4 in conjunction with FIG. 3. FIG. 4 is a diagram illustrating an implementation of the correspondence between control bit settings of the control unit 330 shown in FIG. 3 and the transmission gains provided by the gain stage 308 shown in FIG. 3. In this implementation, the control unit 330 may be implemented by a control register having four control bits, wherein the control register is arranged to set the gain of the gain stage 308 in a range from −9 dB to +6 dB.

As the power amplification circuit 316 may operate in the non-linear region when the gain of the gain stage 308 is too large, the wireless transmission system 300 may further include a signal feedback path 322 and a signal processing unit 350, wherein the signal feedback path 322 and the signal processing unit 350 are arranged to obtain transmission characteristics of the power amplification circuit 316 (e.g. a relationship between an input power and a corresponding gain) to thereby determine a default gain of the gain stage 308. Hence, the power amplification circuit 316 may operate in a suitable input power range (e.g. equal to or smaller than the input power $P_{1dB}$ shown in FIG. 2). Additionally, the transmitted signal may meet the EVM specification, and the output power may be large enough to allow use in further application.

More specifically, when the wireless transmission system 300 performs the self-calibration, the control unit 330 may set the gain of the gain stage 308 as a specific transmission gain of the transmission gains. The signal generation unit 340 may generate N test signals $S\_T_1$-$S\_T_N$, and transmit the N test signals $S\_T_1$-$S\_T_N$ through the signal transmission path 302 in sequence to generate N amplified test signals $S\_A_1$-$S\_A_N$, wherein at least a portion of powers of the test signals $S\_T_1$-$S\_T_N$ correspond to the transmission gains, respectively.

Next, the N amplified test signals $S\_A_1$-$S\_A_N$ may be received through the signal feedback path 322, and N feedback signals $S\_F_1$-$S\_F_N$ are generated accordingly. The signal processing unit 350 may receive the N feedback signals $S\_F_1$-$S\_F_N$ to obtain corresponding signal gains. Finally, the signal processing unit 350 may determine the default gain of the gain stage 308 according to the signal gains. For example, the signal processing unit 350 may obtain a correspondence between the signal gains and the N test signals $S\_T_1$-$S\_T_N$, according to the signal gains, and refer to the correspondence between the powers of the test signals and the transmission gains to determine a proper transmission gain as the default gain of the gain stage 308.

Figure 5:
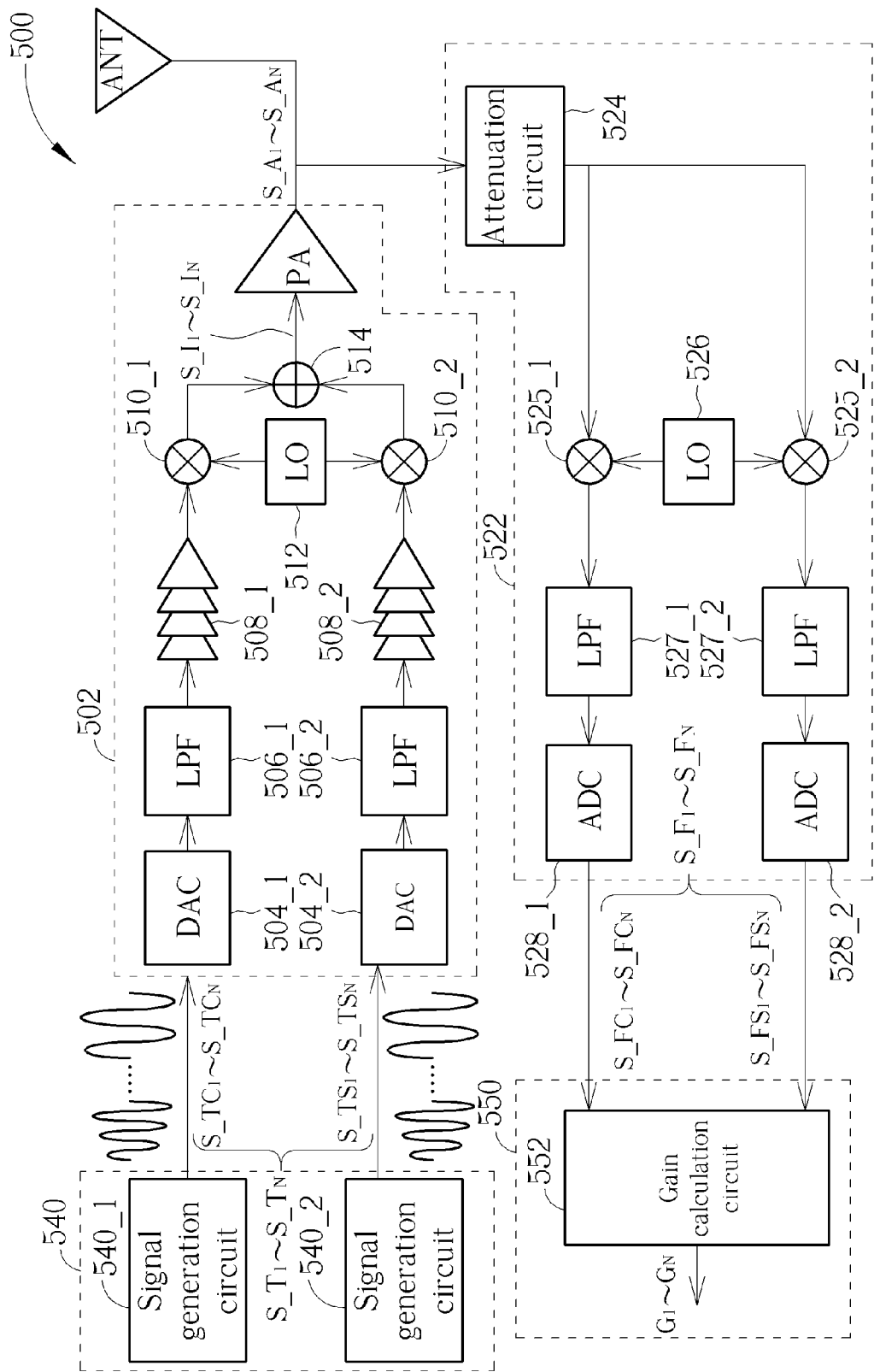
FIG. 5 is a diagram illustrating an exemplary wireless transmission system according to an embodiment of the present invention.

An exemplary implementation using sinusoidal signals as test signals is given in the following for further description of the proposed wireless transmission system employing self-calibration mechanism. Please refer to FIG. 5, which is a diagram illustrating an exemplary wireless transmission system according to an embodiment of the present invention. The architecture of the wireless transmission system 500 is based on that of the wireless transmission system 300. The wireless transmission system 500 may include a signal transmission path 502, a signal feedback path 522, a signal generation unit 540, a signal processing unit 550 and an antenna ANT. In this embodiment, the signal generation unit 540 may generate N test signals $S\_T_1$-$S\_T_N$, wherein each test signal may include a cosine signal generated from a signal generation circuit 540_1 and a sine signal generated from a signal generation circuit 540_2. The signal transmission path 502 may include a plurality of digital-to-analog converters (DACs) 504_1-504_2, a plurality of low-pass filters (LPFs) 506_1-506_2, a plurality of gain stages 508_1-508_2, a plurality of mixers 510_1-510_2, a local oscillator (LO) 512, a summer 514 and a RF power amplifier PA, wherein the gain stage 508_1/508_2 may be used to implement the gain stage 308 shown in FIG. 3, and the RF power amplifier PA may be used to implement the power amplification circuit 316 shown in FIG. 3.

In this embodiment, for purposes of brevity and clarity, the correspondence between transmission gains and control bit settings of the gain stage 508_1 employs the correspondence shown in FIG. 4, and so does that of the gain stage 508_2. In addition, the number of the test signals generated by the signal generation unit 540 equals the number of the transmission gains of the gain stage 508_1/508_2 (i.e. N equals 16). The signal generation unit 540 may transmit the N test signals $S\_T_1$-$S\_T_N$ in sequence according to an order of power levels of the N test signals $S\_T_1$-$S\_T_N$ (e.g. in an order from a minimum power to a maximum power), wherein a power difference between two consecutive test signals is 1 dB (i.e. equals a gain difference between two consecutive transmission gains of the gain stage 508_1/508_2). In other words, the signal generation circuit 540_1 may transmit a plurality of cosine signals $S\_TC_1$-$S\_TC_N$ in sequence (i.e. the transmit power level is 1 dB increment) and the signal generation circuit 540_2 may transmit a plurality of sine signals $S\_TS_1$-

S_TS$_N$ in sequence (i.e. the transmit power level is 1 dB increment). Thus, transmitting the N test signals ST_-S_T$_N$ through the signal transmission path 502 in sequence may be regarded as transmitting a single test signal through the signal transmission path 502 in different transmission gain settings.

When the wireless transmission system 500 starts performing the self-calibration, the respective gains of the gain stage 508_1 and the 508_2 may be set as maximum transmission gains. Next, the signal generation unit 540 may transmit the N cosine signals S_TC$_1$-S_TC$_N$ in sequence, wherein each cosine signal is transmitted to the summer 514 through the DAC 504_1, the LPF 506_1, the gain stage 508_1 and the mixer 510_1 (which mixes a signal thereof with a signal of the LO 512). The N sine signals S_TS$_1$-S_TS$_N$ may be transmitted to the summer 514 through similar operations. The summer 514 may sum a sine signal and a corresponding cosine signal in order to generate N input signals S_I$_1$-S_I$_N$ in sequence. The RF power amplifier PA may amplify the input signals S_I$_1$-S_I$_N$ in sequence to generate N amplified test signals S_A$_1$-S_A$_N$. As a person skilled in the art should understand the operations of the DACs 504_1 and 504_2, the LPFs 506_1 and 506_2, the mixers 510_1 and 510_2, the LO 512 and the summer 514, further description is omitted here for brevity.

Next, the signal processing unit 550 may receive the N amplified test signals S_A$_1$-S_A$_N$ through the signal feedback path 522, wherein the signal feedback path 522 may include an attenuator 524, a plurality of mixers 525_1-525_2, a LO 526, a plurality of LPFs 527_1-527_2 and a plurality of analog-to-digital converters (ADCs) 528_1-528_2. The attenuator 524 may be used to attenuate the N amplified test signals S_A$_1$-S_A$_N$ in order to meet input power requirements of further operations. An in-phase component and a quadrature component of an attenuated signal may be processed through different paths, respectively. A gain calculation circuit 552 may obtain signal gains G$_1$-G$_N$ according to N in-phase signals S_FC$_1$-S_FC$_N$ (respectively corresponding to the N cosine signals S_TC$_1$-S_TC$_N$) and N quadrature signals S_FS$_1$-S_FS$_N$ (respectively corresponding to the N sine signals S_TS$_1$-S_TS$_N$), wherein the combination of the N in-phase signals S_FC$_1$-S_FC$_N$ and the N quadrature signals S_FS$_1$-S_FS$_N$ may be regarded as the N feedback signals SF$_1$-S_F$_N$.

Figure 6:
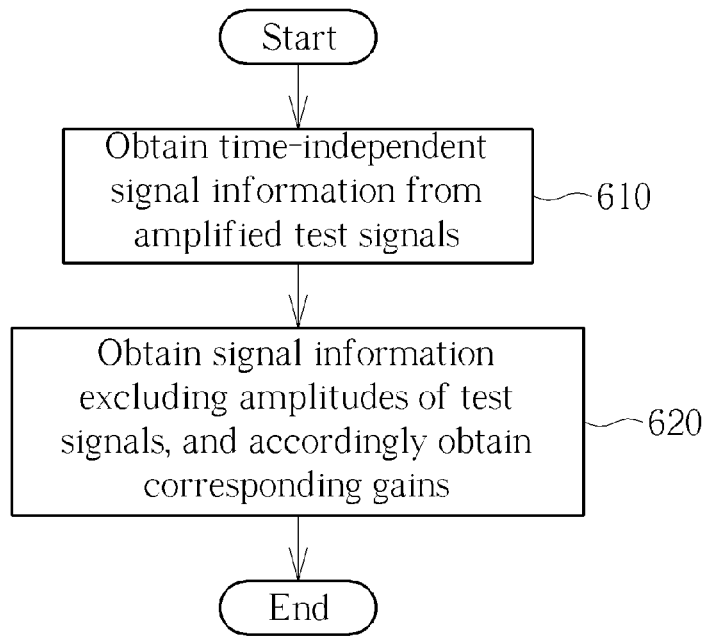
FIG. 6 is a flow chart illustrating an exemplary signal gain calculation method according to an embodiment of the present invention.

The process for obtaining the signal gains G$_1$-G$_N$ from the N feedback signals S_F$_1$-S_F$_N$ is described in detail below. Please refer to FIG. 6 in conjunction with FIG. 5. FIG. 6 is a flow chart illustrating an exemplary signal gain calculation method according to an embodiment of the present invention. The signal gain calculation method may be employed in the wireless transmission system 500. An exemplary implementation of the signal gain calculation of the test signal S_T$_1$ is described in the following. First, the cosine signal S_TC$_1$ and the sine signal S_TS$_1$ may be represented as $A_1 \cos(2\pi ft)$ and $A_1 \sin(2\pi ft)$, respectively. Hence, the test signal S_T$_1$ generated by the signal generation unit 540 may be represented as $A_1 \cos(2\pi ft) + jA_1 \sin(2\pi ft) = A_1 e^{j2\pi ft}$, wherein the symbol $A_1$ represents an amplitude of the test signal S_T$_1$, the symbol f represents a frequency of the test signal S_T$_1$, and the symbol t represents time.

After the test signal S_T$_1$ is amplified through the signal transmission path 502, the amplified test signal S_A$_1$ may be represented as $A_1 B_1 e^{j(2\pi ft + \Phi 1)}$, wherein the symbol $B_1$ represents a gain provided by the RF power amplifier PA for the test signal S_T$_1$, and the symbol $\Phi 1$ represents a phase difference generated in the test signal S_T$_1$ due to the transmission through the RF power amplifier PA. A transmission gain provided by the gain stage 508_1/508_2 is neglected to simplify the calculation.

Similarly, without prejudice to the determination of the default gain, the attenuation imposed by the attenuation circuit 524 on the amplified test signal S_A$_1$ may be neglected to simplify the calculation. Hence, the feedback signal S_F$_1$ received by the gain calculation circuit 552 may be represented as $A_1 B_1 e^{j(2\pi ft + \Phi 1)}$. After receiving the feedback signal S_F$_1$, the gain calculation circuit 552 may multiply the feedback signal SF$_1$ by $e^{-j2\pi ft}$, and integrate with time to obtain time-independent signal information $A_1 B_1 e^{j\Phi 1}$ (in step 610). Next, the gain calculation circuit 552 may divide the signal information $A_1 B_1 e^{j\Phi 1}$ by the amplitude $A_1$ of the test signal S_T$_1$, and accordingly obtain the signal gain G$_1$ of the test signal S_T$_1$ (i.e. $|B_1|^2$) (in step 620).

Figure 7:
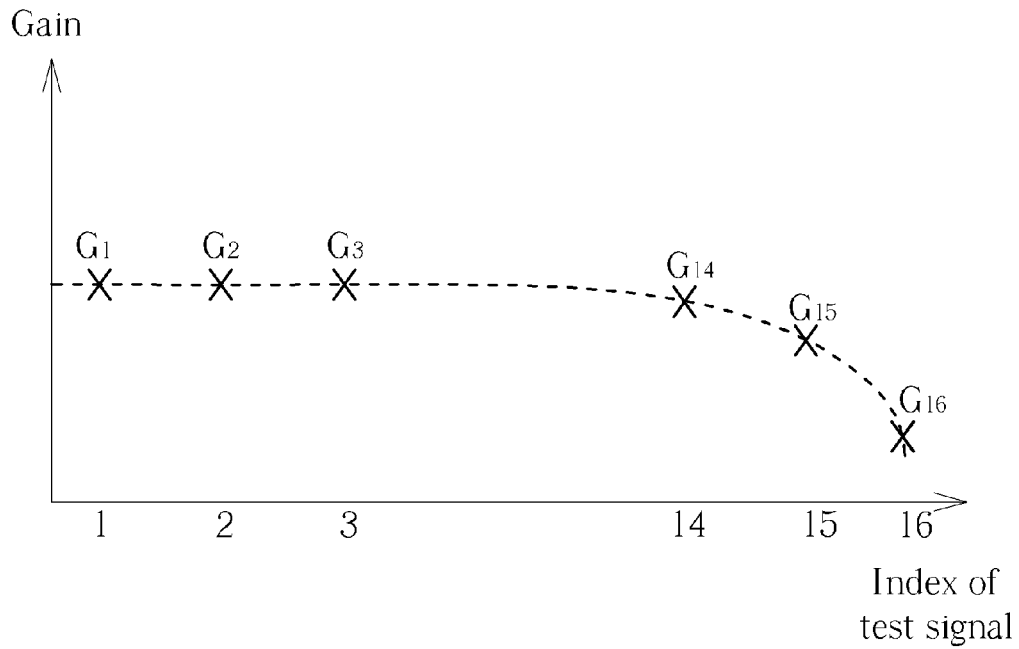
FIG. 7 is a diagram illustrating a relationship between the index of the test signal shown in FIG. 5 and the corresponding signal gain.

The signal gains G$_1$-G$_N$ respectively corresponding to the test signals S_T$_1$-S_T$_N$ may be obtained based on the aforementioned calculation procedure, and the signal processing unit 550 may obtain the correspondence between the test signals S_T$_1$-S_T$_N$ and the signal gains G$_1$-G$_N$ accordingly. Please refer to FIG. 7, which is a diagram illustrating a relationship between the index of the test signal shown in FIG. 5 (i.e. the suffix) and the corresponding signal gain. As shown in FIG. 7, the signal gain G$_{14}$ corresponding to the test signal S_T$_{14}$ starts to decrease. In other words, when input signals of the RF power amplifier PA are the test signals S_T$_{14}$-S_T$_{16}$, the RF power amplifier PA operates in the non-linear region.

Figure 8:
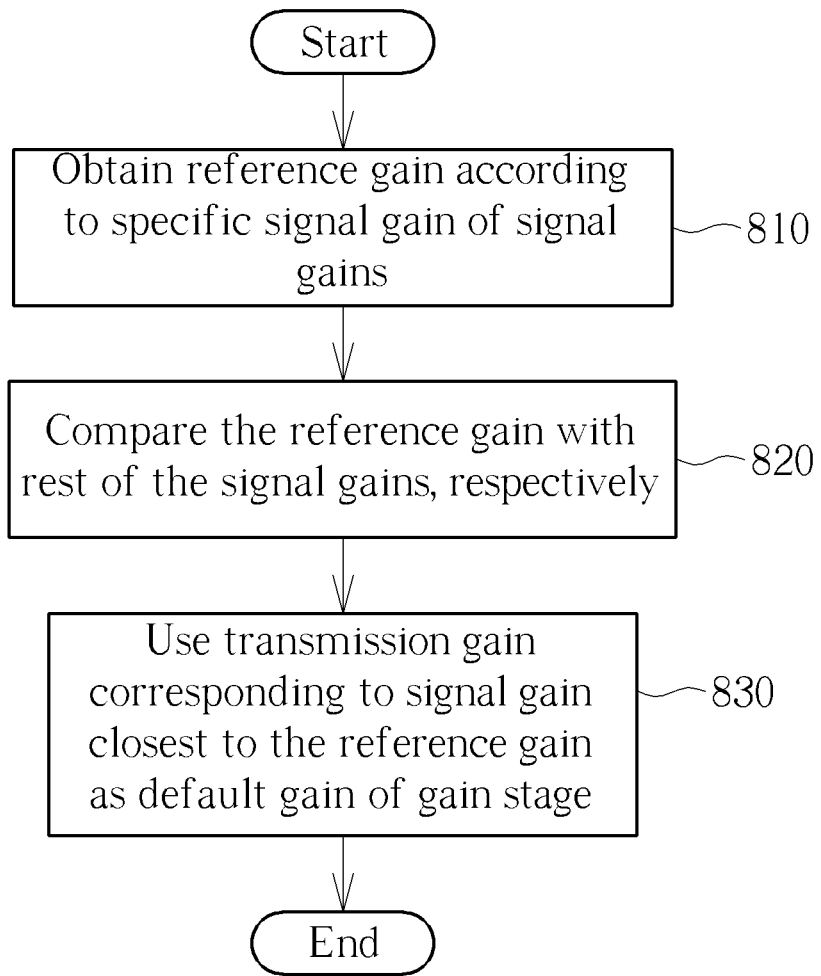
FIG. 8 is a flow chart illustrating an exemplary method of referring to signal gains to determine a default gain of a gain stage according to an embodiment of the present invention.

As the test signals S_T$_1$-S_T$_{16}$ correspond to different powers, the proper operating region of the RF power amplifier PA may be determined according to the obtained signal gains G$_1$-G$_N$. Please refer to FIG. 8 in conjunction with FIG. 7. FIG. 8 is a flow chart illustrating an exemplary method of referring to signal gains to determine a default gain of a gain stage according to an embodiment of the present invention. First, the flow may obtain a reference gain according to a specific signal gain of the signal gains G$_1$-G$_N$, wherein the specific signal gain may be the signal gain G$_1$ corresponding to the test signal S_T$_1$ having a minimum power, or a maximum signal gain of the signal gains G$_1$-G$_N$ (in step 810). Next, the flow may compare the reference gain with rest of the signal gains G$_1$-G$_N$, respectively (in step 820), to obtain a signal gain (closest to the reference gain) and a corresponding test signal. After obtaining the corresponding test signal, the flow may determine the default gain of the gain stage according to the correspondence between powers of the test signals and transmission gains (in step 830).

Figure 9:
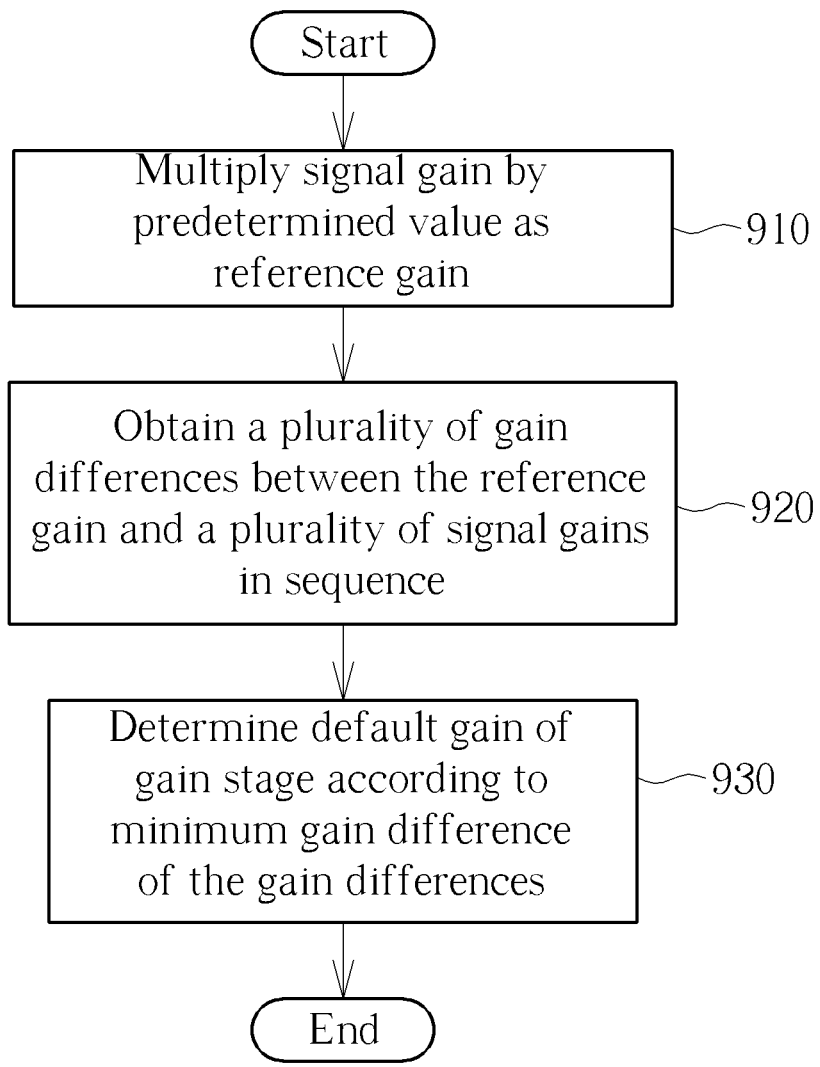
FIG. 9 is an implementation of the exemplary method of referring to the signal gains to determine the default gain of the gain stage shown in FIG. 8.

As mentioned above, a power amplifier may be evaluated according to an input power corresponding to a 1 dB gain decrement of the power amplifier. Thus, the aforementioned reference gain may be set as the specific signal gain minus 1 dB, and the default gain of the gain stage may be determined according to a flow chart shown in FIG. 9. FIG. 9 is an implementation of the method of referring to the signal gains to determine the default gain of the gain stage shown in FIG. 8. In step 910, the flow may multiply the signal gain G$_1$ by a predetermined value (e.g. about 0.79) in order to set the reference gain as the signal gain G$_1$ minus 1 dB. In step 920, the flow may calculate respective gain differences (using absolute values) between the reference gain and each of the signal gains G$_2$-G$_N$. In step 930, the flow may find a minimum gain difference (from the gain differences obtained in step 920) and the corresponding test signal (e.g. the test signal S_T$_{14}$), thereby obtaining the corresponding transmission gain (e.g. +4 dB in the embodiment shown in FIG. 4) according to the index of the test signal (e.g. 14) and accordingly setting the default gain of the gain stage. Further description is detailed below.

Figure 10:
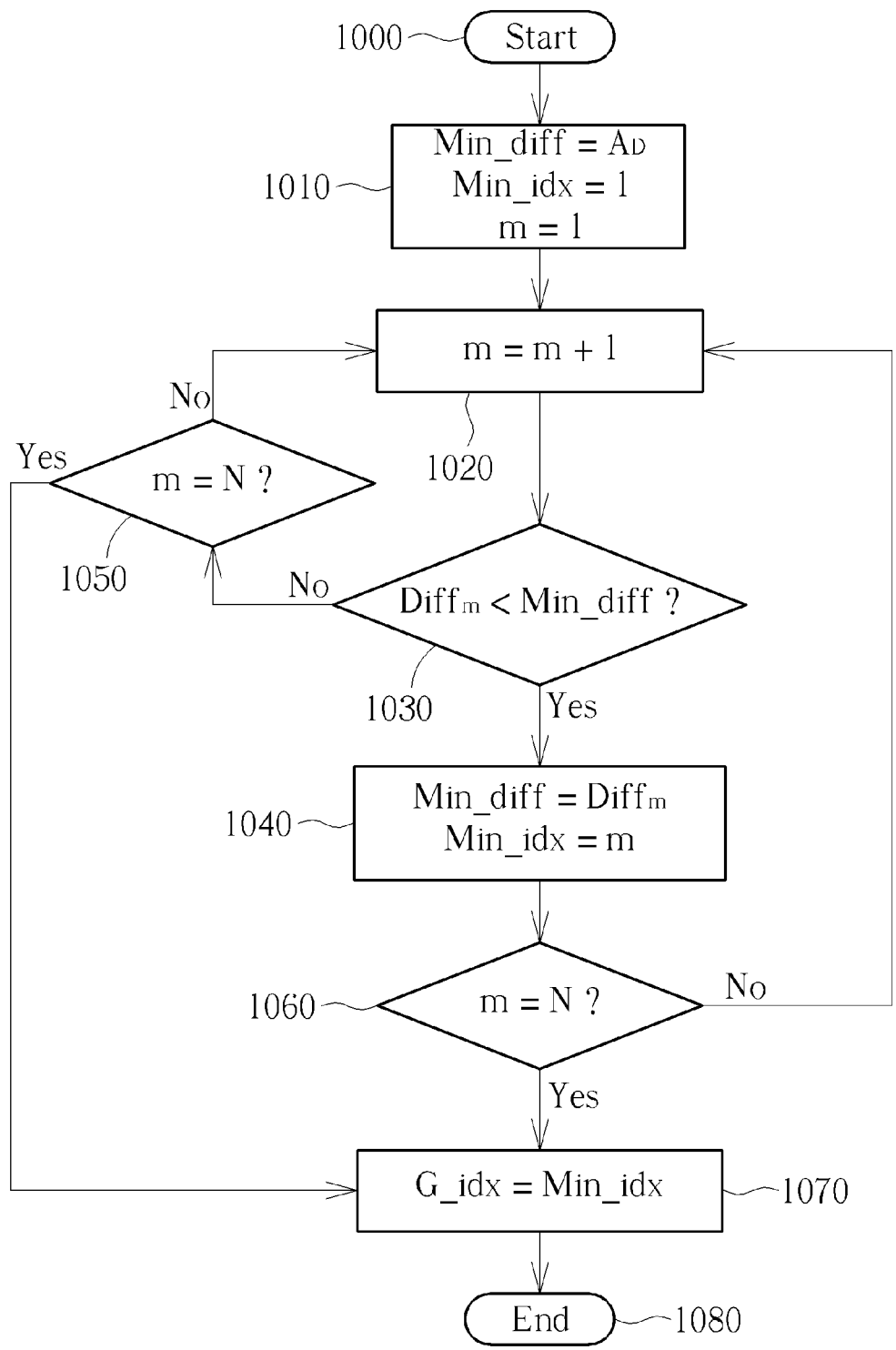
FIG. 10 is a flow chart illustrating an exemplary method of referring to a minimum gain difference to determine a default gain of a gain stage according to an embodiment of the present invention.

Please refer to FIG. 10, which is a flow chart illustrating an exemplary method of referring to a minimum gain difference to determine a default gain of a gain stage according to an embodiment of the present invention. The method may be employed in step 930 shown in FIG. 9, and may be summarized below.

Step 1000: Start.

Step 1010: Set an initial value of a minimum gain difference Min_diff as $A_D$, set an initial value of a minimum gain difference index Min_idx as 1, and set an initial value of a test signal index m as 1.

Step 1020: Add 1 to the test signal index m.

Step 1030: Determine if a gain difference $\text{Diff}_m$ corresponding to the test signal index m is less than the minimum gain difference Min_diff. If yes, go to step 1040; otherwise, go to step 1050.

Step 1040: Set the minimum gain difference Min_diff as the gain difference $\text{Diff}_m$, and set the minimum gain difference index Min_idx as the test signal index m.

Step 1050: Determine if the test signal index m equals to N in order to conform whether the signal gains $G_2$-$G_N$ have been checked. If yes, go to step 1070; otherwise, return to step 1020.

Step 1060: Determine if the test signal index m equals to N in order to conform whether the signal gains $G_2$-$G_N$ have been checked. If yes, go to step 1070; otherwise, return to step 1020.

Step 1070: Set a default gain index G_idx as the minimum gain difference index Min_idx.

Step 1080: End.

The initial value $A_D$ set in step 1010 may be set according to the actual requirements/considerations, and the initial value $A_D$ may be regarded as a default error between the signal gain and the reference gain. After reading paragraphs directed to FIG. 2-FIG. 9, a person skilled in the art should understand that the default gain index G_idx obtained in the flow chart shown in FIG. 10 may be used to determine the default gain of the gain stage according to the control bit settings shown in FIG. 4. Further description is omitted here for brevity.

In view of above, the default gain of the gain stage may be determined according to the correspondence between the powers of the test signals and the transmission gains. Please note that the above correspondence between the control bit settings and the transmission gains is for illustrative purposes only, and is not meant to be a limitation of the present invention. For example, the gain difference between two consecutive transmission gains is not limited to 1 dB, and the relationship of gain differences between consecutive transmission gains of the transmission gains to the control bit settings in an order from the control bit setting "0000" to the control bit setting "1111" is not limited to an ascending relationship. In addition, the number of the control bits may depend on the actual requirements/considerations.

In stead of an ascending order of power levels, an order of transmission of the test signals may correspond to a descending order of power levels or other predetermined transmission orders. The number of the test signals is not limited to the number of the transmission gains. In addition, when the self-calibration is performed, a preset gain of the gain stage (i.e. the specific transmission gain) is not limited to a maximum transmission gain as long as the preset gain is sufficiently large. In brief, as long as the signal processing unit can obtain the correspondence between the received signals and the transmission gains, the test signals may be transmitted in various orders, and the number of the test signals may be different from that of the transmission gains.

Moreover, in a case where the sinusoidal signals are used as the test signals, it is feasible to realize the self-calibration mechanism by employing a single signal generation circuit (e.g. only one of the signal generation circuit 504_1 and the signal generation circuit 504_2 is needed) and circuit elements included in the corresponding signal transmission path and signal feedback path. It is also feasible to use signals having other types of waveforms as the aforementioned test signals.

To sum up, the proposed method for determining a default gain may enable a wireless transmission system to perform self-calibration so that a proper preset operating region of the wireless transmission system can be ensured. Hence, the wireless transmission system may not only meet the EVM specification but also output enough output power, resulting in improved transmitter spectral performance as well as significant savings in operating cost for an HPA. In addition, the proposed self-calibration mechanism needs not external circuits for testing a wireless transmitter, thus saving time and reducing labor costs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for determining a default gain of a wireless transmission system, the wireless transmission system comprising a signal transmission path and a signal feedback path, the signal feedback path being coupled to the signal transmission path, the signal transmission path comprising a power amplification circuit and a gain stage, the gain stage having a plurality of transmission gains; the method comprising:

setting a gain of the gain stage as a specific transmission gain of the transmission gains;

when the gain of the gain stage is set as the specific transmission gain, transmitting a plurality of test signals through the signal transmission path in sequence to generate a plurality of amplified test signals, wherein at least a portion of powers of the test signals correspond to the transmission gains, respectively;

receiving the amplified test signals through the signal feedback path in sequence, and accordingly obtaining corresponding signal gains; and determining a default gain of the gain stage according to the signal gains.

2. The method of claim 1, wherein the specific transmission gain is a maximum transmission gain of the transmission gains.

3. The method of claim 1, wherein the number of the test signals equals the number of the transmission gains.

4. The method of claim 3, wherein a relationship of power differences between consecutive test signals of the test signals to the powers of the test signals in an order from a minimum power to a maximum power is identical to a relationship of gain differences between consecutive transmission gains of the transmission gains to gain magnitudes of the transmission gains in an order from a minimum transmission gain to a maximum transmission gain.

5. The method of claim 1, wherein an order of transmission of the test signals corresponds to an order of power levels of the test signals.

6. The method of claim 1, wherein the step of determining the default gain of the gain stage according to the signal gains comprises:

obtaining a reference gain according to a specific signal gain of the signal gains;
   comparing the reference gain with rest of the signal gains, respectively; and
   using a transmission gain corresponding to a signal gain closest to the reference gain as the default gain of the gain stage.

7. The method of claim 6, wherein the specific signal gain is a signal gain corresponding to a test signal having a minimum power, or a maximum signal gain of the signal gains.

8. The method of claim 6, wherein the step of obtaining the reference gain according to the specific signal gain of the signal gains comprises:

multiplying the specific signal gain by a predetermined value as the reference gain.

9. The method of claim 1, wherein each of the test signals is a sinusoidal signal.

10. A wireless transmission system, comprising:

a signal transmission path, comprising:
       a gain stage, having a plurality of transmission gains; and
       a power amplification circuit;
    a signal feedback path, coupled to the signal transmission path;
    a control unit, for setting a gain of the gain stage as a specific transmission gain of the transmission gains;
    a signal generation unit, coupled to the signal transmission path, the signal generation unit arranged for generating a plurality of test signals, and transmitting the test signals through the signal transmission path in sequence to generate a plurality of amplified test signals when the gain of the gain stage is set as the specific transmission gain, wherein at least a portion of powers of the test signals correspond to the transmission gains, respectively; and
    a signal processing unit, coupled to the signal feedback path, the signal processing unit arranged for receiving the amplified test signals through the signal feedback path, accordingly obtaining corresponding signal gains, and determining a default gain of the gain stage according to the signal gains.

11. The wireless transmission system of claim 10, wherein the specific transmission gain is a maximum transmission gain of the transmission gains.

12. The wireless transmission system of claim 10, wherein the number of the test signals equals the number of the transmission gains.

13. The wireless transmission system of claim 12, wherein a relationship of power differences between consecutive test signals of the test signals to the powers of the test signals in an order from a minimum power to a maximum power is identical to a relationship of gain differences between consecutive transmission gains of the transmission gains to gain magnitudes of the transmission gains in an order from a minimum transmission gain to a maximum transmission gain.

14. The wireless transmission system of claim 10, wherein an order of transmission of the test signals corresponds to an order of power levels of the test signals.

15. The wireless transmission system of claim 10, wherein the signal processing unit obtains a reference gain according to a specific signal gain of the signal gains, compares the reference gain with rest of the signal gains, respectively, and uses a transmission gain corresponding to a signal gain closest to the reference gain as the default gain of the gain stage.

16. The wireless transmission system of claim 15, wherein the specific signal gain is a signal gain corresponding to a test signal having a minimum power, or a maximum signal gain of the signal gains.

17. The wireless transmission system of claim 15, wherein the signal processing unit multiplies the specific signal gain by a predetermined value as the reference gain.

18. The wireless transmission system of claim 10, wherein each of the test signals is a sinusoidal signal.

* * * * *